United States Patent
Huang et al.

(10) Patent No.: US 12,405,246 B2
(45) Date of Patent: Sep. 2, 2025

(54) PHOTOIONIZATION DETECTOR LAMP AND ITS METHOD OF MANUFACTURE

(71) Applicant: HONEYWELL INTERNATIONAL INC., Charlotte, NC (US)

(72) Inventors: Chuang Huang, Shanghai (CN); Qingling Wang, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 277 days.

(21) Appl. No.: 18/317,180

(22) Filed: May 15, 2023

(65) Prior Publication Data
US 2023/0393095 A1 Dec. 7, 2023

(30) Foreign Application Priority Data
Jun. 1, 2022 (CN) .......................... 202210615209.3

(51) Int. Cl.
*G01N 27/66* (2006.01)
*G01N 30/64* (2006.01)

(52) U.S. Cl.
CPC ............. *G01N 27/66* (2013.01); *G01N 30/64* (2013.01); *G01N 2030/642* (2013.01)

(58) Field of Classification Search
CPC ......... G01N 27/66; H01J 9/266; H01J 61/361
See application file for complete search history.

(56) References Cited

U.S. PATENT DOCUMENTS

| 10,989,691 B2 | 4/2021 | Su et al. |
| 2005/0218811 A1* | 10/2005 | Schulman ............. H01J 61/302 |
| | | 313/637 |
| 2014/0167612 A1 | 6/2014 | Perelman et al. |

FOREIGN PATENT DOCUMENTS

| GB | 2424755 A | 10/2006 |
| JP | 08-236084 A | 9/1996 |
| JP | 2006-092788 A | 4/2006 |
| WO | 2017/170051 A1 | 10/2017 |

OTHER PUBLICATIONS

European search report Mailed on Oct. 27, 2023 for EP Application No. 23173089, 7 page(s).

* cited by examiner

*Primary Examiner* — David P Porta
*Assistant Examiner* — Casey Bryant
(74) *Attorney, Agent, or Firm* — Alston & Bird LLP

(57) ABSTRACT

Embodiments are provided for ultraviolet lamps for use in photoionization detectors and methods of manufacturing same. An example method of manufacturing an ultraviolet lamp includes providing a glass tube, the glass tube defining a first end; applying a mixed powder coating composition onto an edge surface of the first end of the glass tube, the mixed powder coating composition comprising indium powder and glass powder; applying a glass powder coating composition over the mixed powder coating composition; attaching a crystal window to the edge surface of the first end of the glass tube; and heating the glass tube and the crystal window to seal the crystal window to the glass tube.

20 Claims, 4 Drawing Sheets

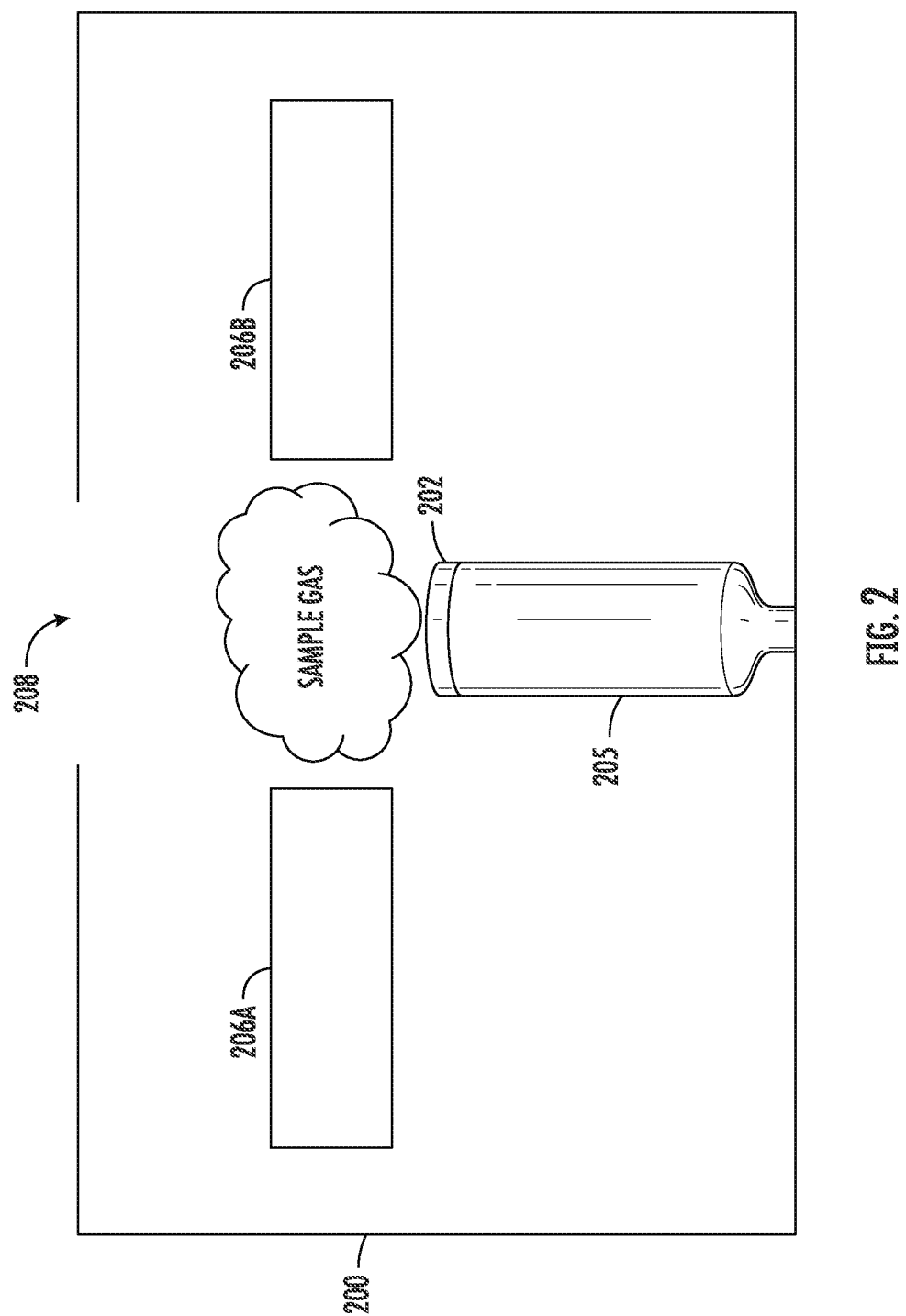

PHOTOIONIZATION DETECTOR LAMP AND ITS METHOD OF MANUFACTURE

CROSS-REFERENCE TO RELATED APPLICATIONS

This application claims priority pursuant to 35 U.S.C. 119(a) to Chinese Application No. 202210615209.3, filed Jun. 1, 2022, which application is incorporated herein by reference in its entirety.

TECHNOLOGICAL FIELD

Example embodiments of the present disclosure relate generally to photoionization gas detectors and, more particularly, to methods for fabricating a vacuum ultraviolent lamp for use with a photoionization detector.

BACKGROUND

Gas sensors and detectors are used in a variety of industries and environments to detect the presence of and/or measure concentration levels of organic compounds and/or other analytes in gaseous substances. In a photoionization gas detector, a vacuum ultraviolet lamp emits photons that ionizes a target analyte, such as trace volatile organic compounds, in a gaseous substance, resulting in electrons being ejected and forming positively charged molecules. The inventors have identified numerous deficiencies with these existing technologies in the field, the remedies for which are the subject of the embodiments described herein.

BRIEF SUMMARY

In general, embodiments of the present disclosure provided herein include photoionization detector lamps and improved methods for sealing a UV transmission crystal window to a glass tube, the crystal window and glass tube having differing coefficients of thermal expansion (CTE). In accordance with one exemplary embodiment of the present disclosure, a method of manufacturing a vacuum ultraviolet lamp for use with a photoionization detector may comprise providing a glass tube, the glass tube defining a first end, applying a mixed powder coating composition onto an edge surface of the first end of the glass tube, the mixed powder coating composition comprising indium powder and glass powder, applying a glass powder coating composition over the mixed powder coating composition, attaching a crystal window to the edge surface of the first end of the glass tube, and heating the glass tube and the crystal window to seal the crystal window to the glass tube.

In some embodiments, the crystal window and the glass tube have different coefficients of thermal expansion (CTE). In certain embodiments, the crystal window comprises lithium fluoride. In other embodiments, the crystal window comprises calcium fluoride.

In some embodiments, heating the glass tube and the crystal window comprises heating the glass tube and the crystal window in a heating chamber above about 400° C. In certain embodiments, heating the glass tube and the crystal window comprises heating the glass tube and the crystal window for at least 30 minutes.

In some embodiments, the method further comprises applying a coating of glue at an external interface of the glass tube and the crystal window. In certain embodiments, the glue is UV glue.

In some embodiments, the glass tube defines a second end opposite the first end, and the method further comprises attaching a vacuum system to the second end of the glass tube, filling the glass tube with a low pressure gas, and melting the second end of the glass tube such that the low pressure gas is sealed within the glass tube.

In accordance with another exemplary embodiment of the present disclosure, a vacuum ultraviolet lamp comprises a glass tube, the glass tube defining a first end, a crystal window sealed to the first end of the glass tube, wherein sealing the crystal window to the first end of the glass comprises applying a mixed powder coating composition onto an edge surface of the first end of the glass tube, the mixed powder coating composition comprising indium powder and glass powder, applying a glass powder coating composition over the mixed powder coating composition, attaching the crystal window to the edge surface of the first end of the glass tube, and heating the glass tube and the crystal window to seal the crystal window to the glass tube.

In some embodiments, the crystal window and the glass tube have different coefficients of thermal expansion (CTE). In certain embodiments, the crystal window comprises lithium fluoride. In other embodiments, the crystal window comprises calcium fluoride.

In some embodiments, heating the glass tube and the crystal window comprises heating the glass tube and the crystal window in a heating chamber above about 400° C. In certain embodiments, heating the glass tube and the crystal window comprises heating the glass tube and the crystal window for at least 30 minutes.

In some embodiments, the vacuum ultraviolet lamp comprises at least one fill gas sealed within the glass tube and crystal window.

In accordance with another exemplary embodiment of the present disclosure, a photoionization detector comprises two electrodes and a vacuum ultraviolet lamp comprising a glass tube, the glass tube defining a first end, a crystal window sealed to the first end of the glass tube, wherein sealing the crystal window to the first end of the glass comprises applying a mixed powder coating composition onto an edge surface of the first end of the glass tube, the mixed powder coating composition comprising indium powder and glass powder, applying a glass powder coating composition over the mixed powder coating composition, attaching the crystal window to the edge surface of the first end of the glass tube, and heating the glass tube and the crystal window to seal the crystal window to the glass tube.

In some embodiments, the crystal window and the glass tube of the vacuum ultraviolet lamp have different coefficients of thermal expansion (CTE). In certain embodiments, the crystal window comprises lithium fluoride. In other embodiments, the crystal window comprises calcium fluoride.

In some embodiments, the vacuum ultraviolet lamp is filled with a low pressure fill gas.

In some embodiments, the two electrodes are disposed proximate to the crystal window of the vacuum ultraviolet lamp.

In some embodiments, the photoionization detector is exposed to a sample gaseous substance and the vacuum ultraviolet lamp emits photon energy to ionize a target analyte in the sample gaseous substance.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1A:
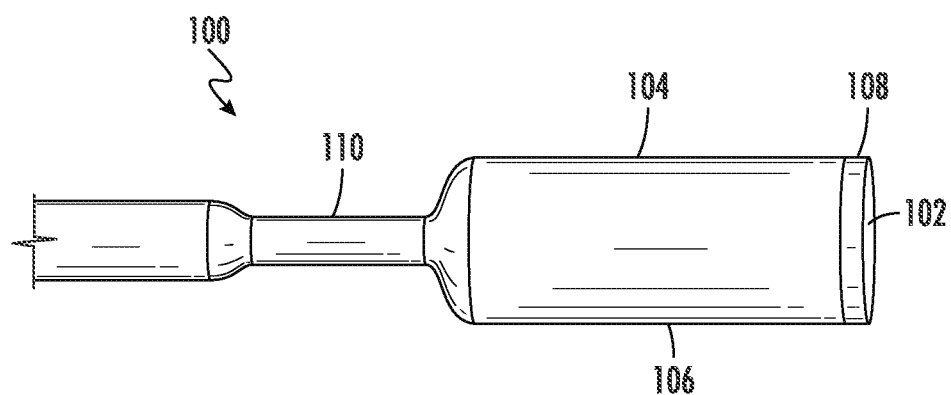
Figure 1B:
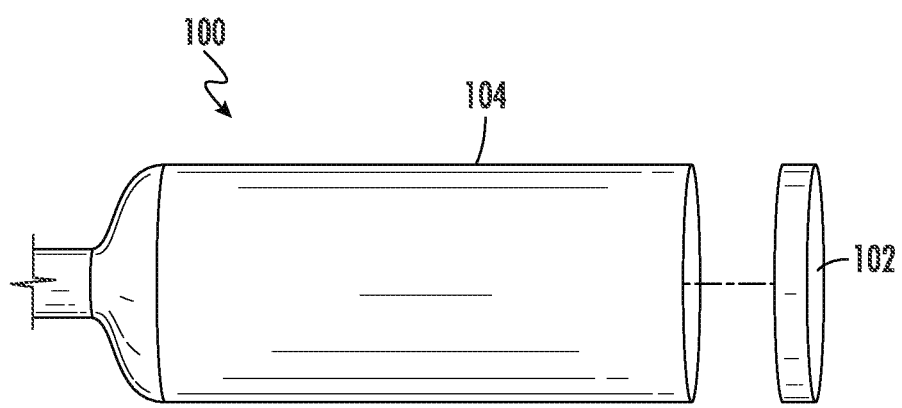
Figure 3:
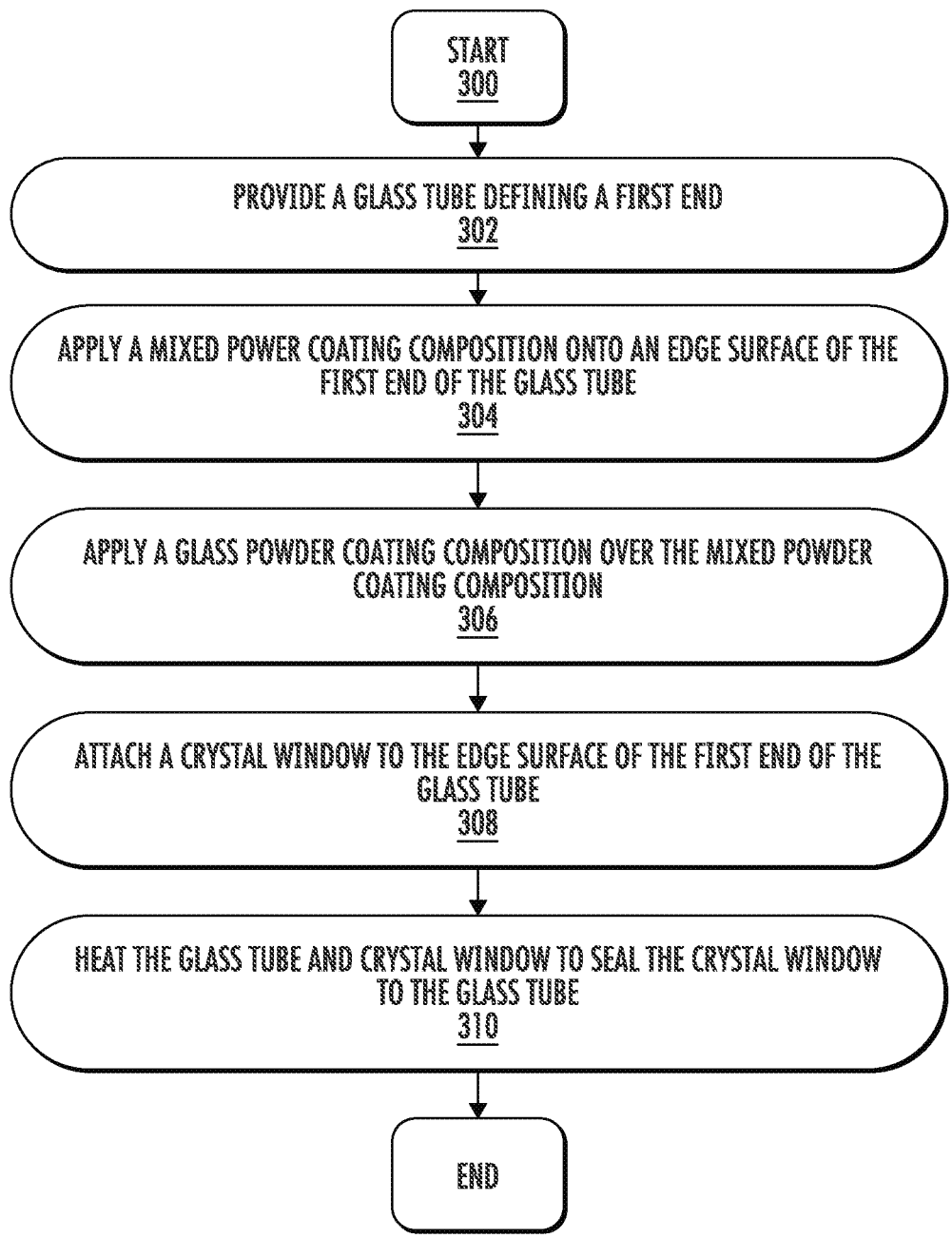

Having thus described certain example embodiments of the present disclosure in general terms above, non-limiting and non-exhaustive embodiments of the subject disclosure will now be described with reference to the accompanying drawings which are not necessarily drawn to scale. The components illustrated in the accompanying drawings may or may not be present in certain embodiments described herein. Some embodiments may include fewer (or more) components than those shown in the drawings. Some embodiments may include the components arranged in a different way:

FIGS. 1A-1B illustrates an example vacuum ultraviolet lamp of the present disclosure according to an example embodiment;

FIG. 2 illustrates an example photoionization detector including an example vacuum ultraviolet lamp of the present disclosure according to an example embodiment;

FIG. 3 illustrates an example method of manufacturing an example vacuum ultraviolet lamp of the present disclosure.

Figure 4:
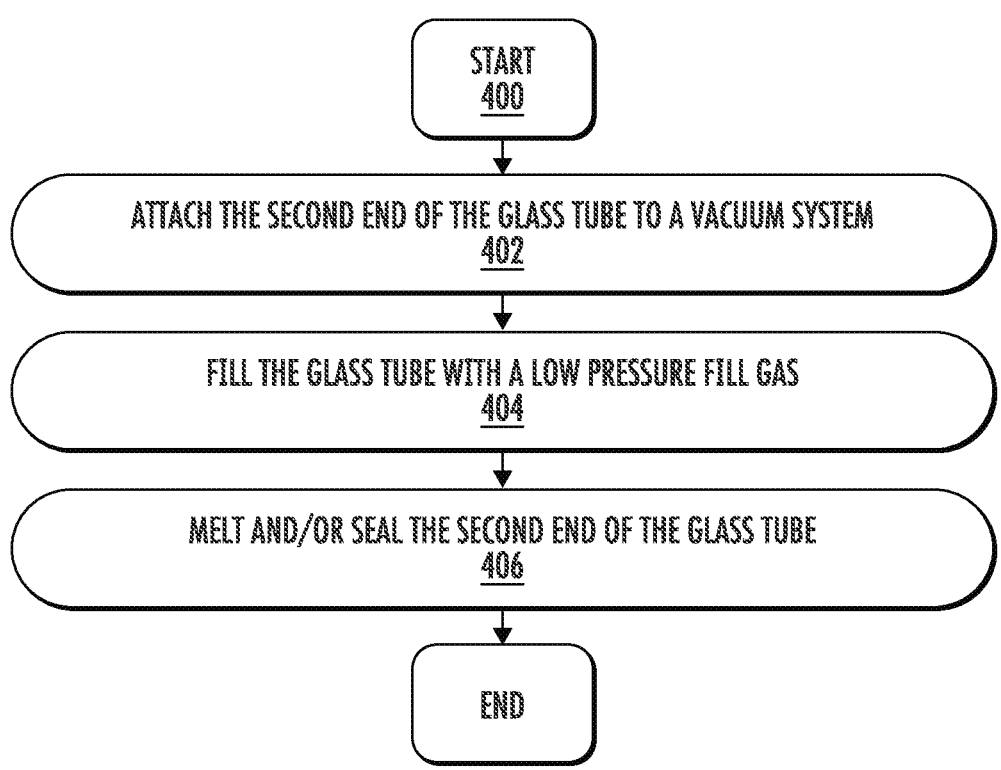

FIG. 4 illustrates an example method of manufacturing an example vacuum ultraviolet lamp of the present disclosure.

DETAILED DESCRIPTION

Overview

One or more example embodiments now will be more fully hereinafter described with reference to the accompanying drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly, this disclosure should not be construed as limited to the embodiments set forth herein. Rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used herein to mean "serving as an example, instance, or illustration." Any implementation described herein as "example" is not necessarily to be construed as preferred or advantageous over other implementations.

As described above, photoionization detectors may be deployed in a variety of industries to instantaneously detect and/or measure concentration levels of target analyte(s) in the environment, such as monitoring for exposure to volatile organic compounds. Typically, photoionization detectors employ vacuum ultraviolet (VUV) lamp(s) to produce high-energy photons which ionize a target analyte, such as a volatile organic compound, in a gaseous sample. That is, molecules from the surrounding environment enter the photoionization detector and they are bombarded by the high-energy photons directed out of the glass tube via a crystal window such that the molecules are broken into positively charged ions. Electrodes may collect the ions produced and process the electrical signal to determine the presence and/or concentration of the target analyte.

The VUV lamp is a key component of a photoionization detector. Traditionally, a crystal window may be sealed to the glass tube with glass powder to form the VUV lamp. For example, a magnesium fluoride ($MgF_2$) crystal window may be coupled to a glass tube using a glass powder coating therebetween and heating the assembly to several hundred degrees in order to melt the glass powder, thereby sealing the crystal window to the glass tube. Such traditional sealing processes may be sufficient for a $MgF_2$ crystal window as the coefficient of thermal expansion (CTE) of the crystal window is similar to the CTE of the glass tube and glass powder. However, other crystal window materials having a different CTE than the glass tube and glass powder, such as lithium fluoride (LiF), may subsequently fail (e.g., separate from the glass tube) during heating, cooling, and/or operation, thereby breaking the glass tube interface.

Conventional attempts at solving this issue and others have relied upon complete substitution of the glass powder and/or lowering the temperature in order to secure the crystal window to the glass tube. For example, various conventional lamps use an indium ring for sealing at low temperature instead of glass powder. These low temperature attempts, however, result in poor adhesive performance between the crystal window and the glass tube. Often, these conventional attempts are more labor-intensive and require use of a separate glue layer between and around the interface of the crystal window and the glass tube for extra adherence, thereby resulting in lower efficiency. Even with use of the glue, leakage of fill gas from the sealed glass tube is still a risk. Furthermore, because the glue must occupy sufficient space to provide adequate adherence, installation of such lamps using conventional sealing processes is detrimentally affected due to the variations in size of the resulting lamps.

In order to address these problems and others, the embodiments of the present disclosure may implement an improved process for sealing the crystal window to the glass tube when the CTE of the crystal window differs from the CTE of the glass tube. The sealing process of the present disclosure described herein may be configured to allow stress release from the interface of the crystal window and the glass tube during heating and/or cooling. For example, the method of manufacturing a vacuum ultraviolet lamp described herein may include applying a mixed powder coating composition onto an edge surface of a glass tube, the mixed powder coating composition comprising indium powder and glass powder and thereafter, applying a glass powder coating composition over the mixed powder coating composition, before attaching a crystal window to the edge surface of the glass tube. Indium is a soft metal and has a low melting point, such that may increase the flexibility of the glass powder during temperature reduction (e.g., cooling) from a high temperature during the sealing process. The embodiments of the present disclosure further improve production efficiency and provide consistent lamps, ultimately reducing the size variations in the resulting lamps which is important for sensor performance of a photoionization detector.

With reference to FIGS. 1A-1B, an example embodiment of the vacuum ultraviolet lamp 100 of the present disclosure is illustrated. As shown, the VUV lamp 100 comprises a UV transmission crystal window 102 sealed onto a glass tube 104. In operation, photons produced by the VUV lamp 100 and directed out of the glass tube 104 via a crystal window 102 may ionize target gas molecules having an ionization potential less than the energy of the photons produced by the VUV lamp 100. Accordingly, the crystal window material may be selected based upon the intended application of the photoionization detector. Said differently, in some embodiments, different crystal window materials are used such that photons with the desired energy pass through the crystal window 102. For example, a magnesium fluoride ($MgF_2$) crystal window allows both 10.2 and 10.6 eV photons to pass through the crystal window 102 and a lithium fluoride (LiF) crystal window allows 11.7-11.8 eV photons to pass through the crystal window 102.

As shown in FIG. 1A, in some embodiments, the glass tube may include a body 106, a first end 108, and second end 110 opposite the first end. The crystal window 104 may be attached to one end of the glass tube 104 as shown in FIG. 1B. In some embodiments, the crystal window 102 may be bonded to an edge surface of the glass tube 104. In some embodiments, one or more coating compositions are applied to an edge surface of the glass tube 104 and the crystal window 102 may be attached to the glass tube 104 after the coating composition(s) has been applied to the edge surface. In some embodiments, the coating compositions may comprise one layer of material. In some embodiments, the coating compositions may comprise multiple layers of material, separately applied to the edge surface of the glass tube 104.

After the crystal window 102 is sealed to the glass tube 104, the glass tube 104 may be filled with one or more fill gases. In some embodiments, the glass tube 104 may be filled with one or more fill gases. The fill gases may be inert gases, such as hydrogen, krypton, xenon, and/or argon. The glass tube 104 may be configured to attach to a vacuum system, wherein the vacuum system may be used to fill the glass tube with a low pressure fill gas. In some embodiments, the second end 110 of the glass tube 104 is configured to attach to the vacuum system. In some embodiments, once the glass tube 104 is filled with the low pressure fill gas, the second end 110 of the glass tube 104 may be melted and/or sealed in order to seal the fill gas within the glass tube 104 and form the VUV lamp 100.

With reference to FIG. 2, a photoionization detector 200 comprises the finished VUV lamp 205. Said differently, once the VUV lamp 205 has been formed, it may be used in a photoionization detector 200, wherein the fill gas(es) sealed with the sealed glass tube may be used to generate a UV light source for the photoionization detector 200. The fill gas(es) within the VUV lamp 205 may be excited through any of a variety of excitation methods to generate the UV light source.

In some embodiments, the UV light generated inside the lamp 205 may be transmitted through the crystal window 202 to the outside of the lamp 205, wherein molecules in the gaseous substance that the photoionization detector 200 is configured to detect may be exposed to the UV light. Said differently, a gaseous substance enters the photoionization detector 200 through a gas inlet 208 and a target analyte, such as trace volatile organic compounds, in the gaseous substance is ionized by the photons emitted by the VUV lamp 205, resulting in electrons being ejected from the target analyte and forming positively charged ions.

With continued reference to FIG. 2, the photoionization detector 200 may comprise at least two electrodes 206A, 206B. For example, in some embodiments, an anode 206A and a cathode 206B are provided. An electric current may be generated when the electrons and positively charged ions are attracted to their corresponding electrode 206. Measurement of the electrical signal may then be used to determine the presence and/or concentration of the target analyte.

Methods of Manufacturing

With reference to FIG. 3, a method of manufacturing a ultraviolet lamp (e.g., method 300) in accordance with an example embodiment of the present disclosure is illustrated. As shown in operation 302, the method 300 may include providing a glass tube defining a first end. In some embodiments, the glass tube may include a body, a first end, and second end opposite the first end.

At operation 304, the method 300 may include applying a mixed powder coating composition onto an edge surface of the first end of the glass tube. As described above, the mixed powder coating composition may comprise indium powder and glass powder. In some embodiments, the mixed powder coating composition may be a liquid or paste material that dries, adhering to the edge surface of the glass tube. For example, indium powder and glass powder may be mixed together with a liquid solvent, and thereafter, applied to the edge surface of the glass tube.

In some embodiments, the mixed powder coating composition may comprise indium powder and glass powder in a 1:1 ratio by weight. In other embodiments, for instance, the mixed powder coating composition may comprise a larger weight of indium powder than glass powder. In still other embodiments, the mixed powder coating composition may comprise a smaller weight of indium powder than glass powder. For example, in some embodiments, the ratio by weight of indium powder to glass powder in the mixed powder coating composition may be 2:4 to 0.5:4.

According to certain embodiments, the liquid solvent may comprise polyethylene oxide (PEO), water, or any combination thereof. For example, in some embodiments, the ratio by weight of water to PEO in the liquid solvent may be 100:1 to 100:0.1. In some embodiments, the mixed powder coating composition may comprise mixed powder (indium powder and glass powder) to PEO solution (PEO and water) in a 4:2 to 4:0.5 ratio by weight.

In some embodiments, the mixed powder coating composition may be applied to the edge surface using a syringe. In still other embodiments, the mixed powder coating composition may be brushed on, rolled on, sprayed on, and/or otherwise applied onto the edge surface.

At operation 306, the method 300 may include applying a glass powder coating composition over the mixed powder coating composition. In some embodiments, the glass powder coating composition may be a liquid or paste material that dries, adhering to the edge surface of the glass tube. For example, glass powder may be mixed with a liquid solvent, and thereafter, applied over the mixed powder coating composition previously applied to the edge surface of the glass tube. According to certain embodiments, the liquid solvent may comprise polyethylene oxide (PEO), water, or any combination thereof. For example, in some embodiments, the ratio by weight of water to PEO in the liquid solvent may be 100:1 to 100:0.1. In some embodiments, the glass powder coating composition may comprise glass powder to PEO solution (PEO and water) in a 4:2 to 4:0.5 ratio by weight. Without limitation, in some preferred embodiments, the preferred ratio by weight of glass powder to PEO solution (PEO and water) is 4:1.

In some embodiments, the glass powder coating composition may be applied over the mixed powder coating composition using a syringe. In still other embodiments, the glass powder coating composition may be brushed on, rolled on, sprayed on, and/or otherwise applied over the mixed powder coating composition.

At operation 308, the method 300 may include attaching a crystal window to the edge surface of the first end of the glass tube. Said differently, the crystal window may be attached to the glass tube via the applied mixed powder coating composition and applied glass powder coating composition, thereby forming an interface. In some embodiments, the crystal window wherein and the glass tube have different coefficients of thermal expansion (CTE). For example, in some embodiments, the crystal window comprises lithium fluoride. In other embodiments, the crystal window comprises calcium fluoride (CaF).

At operation 310, the method 300 may include heating the glass tube and the crystal window to seal the crystal window to the glass tube. For example, the glass tube and crystal window assembly may be placed in a heating chamber in order to vaporize the liquid solvent(s) of the mixed powder coating composition and the glass powder coating composition, thereby sealing the crystal window to the glass tube. In some embodiments, the heating chamber is heated to at least 400° C. In still further embodiments, the heating chamber is heated to a temperature of 400° C.-550° C. In certain embodiments, the heating chamber is turned off (e.g., after approximately 30 minutes) and the glass tube and crystal window assembly is allowed to cool in the heating chamber.

In some embodiments, the method 300 optionally further comprises applying a coating of glue at an external interface of the glass tube and the crystal window. In certain embodiments, the glue is a UV glue such that it assists in protecting at least the indium powder of the mixed powder coating composition from oxidation due to the surrounding environment.

With reference to FIG. 4, an example method of manufacturing a ultraviolet lamp (e.g., method 400) is illustrated. As shown in operation 402, after the crystal window is sealed to the glass tube, the method 400 may include attaching the second end of the glass tube to a vacuum system. Said differently, the second end of the glass tube may be configured to attached to a vacuum system. In some embodiments, the radius of the second end of the glass tube is smaller than the radius of the first end of the glass tube.

At operation 404, the method 400 may include filling the glass tube with a low pressure fill gas via the vacuum system. In some embodiments, the glass tube may be filled with one or more fill gases. The fill gases may be inert gases, such as hydrogen, krypton, xenon, and/or argon.

At operation 406, once the glass tube is filled with the low pressure fill gas, the method 400 may include melting and/or sealing the second end of the glass tube in order to seal the fill gas(es) within the glass tube and form the VUV lamp.

As described above, once the VUV lamp has been formed, it may be used in a photoionization detector, wherein the fill gas(es) sealed with the sealed glass tube may be used to generate a UV light source for the photoionization detector.

In some embodiments, certain ones of the operations, shown in FIGS. 3 and 4 discussed above, may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of manufacturing a vacuum ultraviolet lamp, the method comprising:
   providing a glass tube, the glass tube defining a first end;
   applying a mixed powder coating composition onto an edge surface of the first end of the glass tube, the mixed powder coating composition comprising indium powder and glass powder;
   applying a glass powder coating composition over the mixed powder coating composition;
   attaching a crystal window to the edge surface of the first end of the glass tube; and
   heating the glass tube and the crystal window to seal the crystal window to the glass tube.

2. The method of claim 1, wherein the crystal window and the glass tube have different coefficients of thermal expansion (CTE).

3. The method of claim 2, wherein the crystal window comprises lithium fluoride.

4. The method of claim 1, wherein heating the glass tube and the crystal window comprises heating the glass tube and the crystal window in a heating chamber above about 400° C.

5. The method of claim 4, wherein heating the glass tube and the crystal window comprises heating the glass tube and the crystal window for at least 30 minutes.

6. The method of claim 1, further comprising applying a coating of glue at an external interface of the glass tube and the crystal window.

7. The method of claim 6, wherein the glue is UV glue.

8. The method of claim 1, wherein the glass tube defines a second end opposite the first end, the method further comprising:
   attaching a vacuum system to the second end of the glass tube;
   filling the glass tube with a low pressure gas; and melting the second end of the glass tube such that the low pressure gas is sealed within the glass tube.

9. A vacuum ultraviolet lamp comprising:
a glass tube, the glass tube defining a first end;
a crystal window sealed to the first end of the glass tube, wherein sealing the crystal window to the first end of the glass tube comprises:
applying a mixed powder coating composition onto an edge surface of the first end of the glass tube, the mixed powder coating composition comprising indium powder and glass powder;
applying a glass powder coating composition over the mixed powder coating composition;
attaching the crystal window to the edge surface of the first end of the glass tube; and
heating the glass tube and the crystal window to seal the crystal window to the glass tube.

10. The vacuum ultraviolet lamp of claim 9, wherein the crystal window and the glass tube have different coefficients of thermal expansion (CTE).

11. The vacuum ultraviolet lamp of claim 10, wherein the crystal window comprises lithium fluoride.

12. The vacuum ultraviolet lamp of claim 9, wherein heating the glass tube and the crystal window comprises heating the glass tube and the crystal window in a heating chamber above about 400° C.

13. The vacuum ultraviolet lamp of claim 12, wherein heating the glass tube and the crystal window comprises heating the glass tube and the crystal window for at least 30 minutes.

14. The vacuum ultraviolet lamp of claim 9, further comprising at least one fill gas sealed within the glass tube and crystal window.

15. A photoionization detector comprising:
two electrodes; and
a vacuum ultraviolet lamp comprising:
a glass tube, the glass tube defining a first end;
a crystal window sealed to the first end of the glass tube, wherein sealing the crystal window to the first end of the glass tube comprises:
applying a mixed powder coating composition onto an edge surface of the first end of the glass tube, the mixed powder coating composition comprising indium powder and glass powder;
applying a glass powder coating composition over the mixed powder coating composition;
attaching the crystal window to the edge surface of the first end of the glass tube; and
heating the glass tube and the crystal window to seal the crystal window to the glass tube.

16. The photoionization detector of claim 15, wherein the crystal window and the glass tube of the vacuum ultraviolet lamp have different coefficients of thermal expansion (CTE).

17. The photoionization detector of claim 16, wherein the crystal window of the vacuum ultraviolet lamp comprises lithium fluoride.

18. The photoionization detector of claim 15, wherein the vacuum ultraviolet lamp is filled with a low pressure fill gas.

19. The photoionization detector of claim 15, wherein the two electrodes are disposed proximate to the crystal window of the vacuum ultraviolet lamp.

20. The photoionization detector of claim 15, wherein the photoionization detector is exposed to a sample gaseous substance and the vacuum ultraviolet lamp emits photon energy to ionize a target analyte in the sample gaseous substance.

* * * * *